United States Patent [19]

Savary et al.

[11] 3,949,207

[45] Apr. 6, 1976

[54] INSTALLATION FOR THE DELIVERY OF LIQUIDS

[75] Inventors: Antoine Savary, Bougy-Villars; Jacques Mouron, Meinier; Jacques Lederrey, Begnins, all of Switzerland

[73] Assignee: Oxy Metal Industries Corporation, Detroit, Mich.

[22] Filed: Apr. 19, 1974

[21] Appl. No.: 462,570

[30] Foreign Application Priority Data

Apr. 19, 1973 Switzerland ........................ 5847/73

[52] U.S. Cl. .......... 235/151.34; 235/151.2; 222/26; 222/71

[51] Int. Cl.$^2$ ...................... B67D 5/30; G06F 15/56

[58] Field of Search ........ 235/151.34, 151.2, 92 FL, 235/153; 222/23, 30, 32, 33, 36, 52, 56, 76, 26; 340/172.5

[56] References Cited

UNITED STATES PATENTS

| | | | |
|---|---|---|---|
| 3,402,851 | 9/1968 | Ciotti et al. | 222/26 X |
| 3,448,895 | 6/1969 | Mesh | 222/76 X |
| 3,498,501 | 3/1970 | Robbins et al. | 222/26 |
| 3,598,283 | 8/1971 | Krutz et al. | 222/76 X |
| 3,613,950 | 10/1971 | Sauber | 222/76 X |
| 3,666,928 | 5/1972 | Burke et al. | 235/151.34 X |
| 3,691,538 | 9/1972 | Haney et al. | 340/173 SP |
| 3,696,236 | 10/1972 | Kus | 235/151.34 |
| 3,765,567 | 10/1973 | Maiocco et al. | 222/76 X |
| 3,813,527 | 5/1974 | Langston | 235/151.34 |

OTHER PUBLICATIONS

*Application of the PRODAC 50 System to Direct Digital Control*, J. C. Belz, G. J. Kirk and P. S. Ratcliffe, IEEE Intl. Conv. Rec. Part 3, 1965, pp. 102–122.

*A Combination Hardware–Software Debugging System*, K. C. Knowlton, IEEE Transactions on Computers, Jan. 1968, pp. 81–86.

*Bulletin 1750 PMC Programmable Controller*, Allen—Bradley Systems Division, Highland Heights, Ohio 44143, July 1973.

*Primary Examiner*—Edward J. Wise
*Attorney, Agent, or Firm*—Arthur E. Kluegel; Richard P. Mueller; B. F. Claeboe

[57] ABSTRACT

The present invention concerns an installation for the delivery of liquids including a main control station, tanks, pumps, pipes, valves, etc., and fed from the latter, at least one delivery "pump" having flow-meter, hose, delivery-nozzle, display panel for showing volumes and prices and apparatus for recording, computing and displaying the quantities of liquids delivered and the amounts to be paid.

3 Claims, 6 Drawing Figures

INSTALLATION FOR THE DELIVERY OF LIQUIDS

DESCRIPTION OF THE INVENTION

Conventional installations for quantitatively delivering liquids, fuels for instance, generally comprise at least one pump for drawing liquid from a reservoir and carrying it through conduits to one or several delivery "pumps". These pumps generally comprise a flexible hose ended by a nozzle which can be introduced, for instance, into the tank of an automobile for refuelling it. The nozzle is provided with a trigger working on a valve placed in the supply circuit for controlling the flow of the liquid being delivered. The delivery pumps also comprise a flow-meter for measuring the quantity of the delivered liquid which drives the elements, generally mechanical, of a display system for indicating the quantities of the liquid being delivered. These figures are displayed on a panel of the pump. Said pump further comprises a device for calculating the amount to be paid as a function of the quantity of delivered liquid and of the unit selling price thereof. This computing device comprises mechanical or electronic computing elements.

In the case of a self-service filling station, the volume and cash indications which appear on the display panels of the different pumps of the station are thereafter transferred to a central station and displayed on another panel generally located in a control-room wherefrom an operator can control the operation of the station, cut it off if necessary, modify the unit price of the fuel displayed on the pumps and cash the bills.

The control-room can also house other attachments connected to the installation by usual means, e.g. additional control devices such as a cash-ticket printer and a general totalizer for recording the whole quantity of the fuel (or fuels) delivered by the station, and the corresponding sum of money.

The computing devices of the pumps having mechanical elements connected between the flow-meter and the display-system are voluminous and, because of their weight, an appreciable amount of force is necessary for putting them in motion. The electronic computing devices do not have this drawback. However, for manufacturing the circuits of said devices, elements have been used, which were selected and assembled as a specific function of the operative parameters to be met. Since said circuits must fulfill complex functions and, furthermore, since they must control the different additional circuits of the control station, they are costly and cumbersome. In addition, for reasons of equity and safety, the Weights and Measures Departments in most countries require all circuits to be doubled which further increases the cost and the bulk of the computing devices.

The installation according to the invention is free from these drawbacks.

It is characterized by the fact that the means for recording, calculating and displaying the volumes delivered and the amounts to be paid comprise a computer.

Because of the many checking possibilities of computers circuits, the doubling of the operational circuits for increasing the reliability according to the Weights and Measures prescriptions becomes unnecessary. Consequently, each pump may comprise only one calculating circuit unit of said computer.

The drawing represents schematically one embodiment of an installation according to the present invention.

Figure 1:
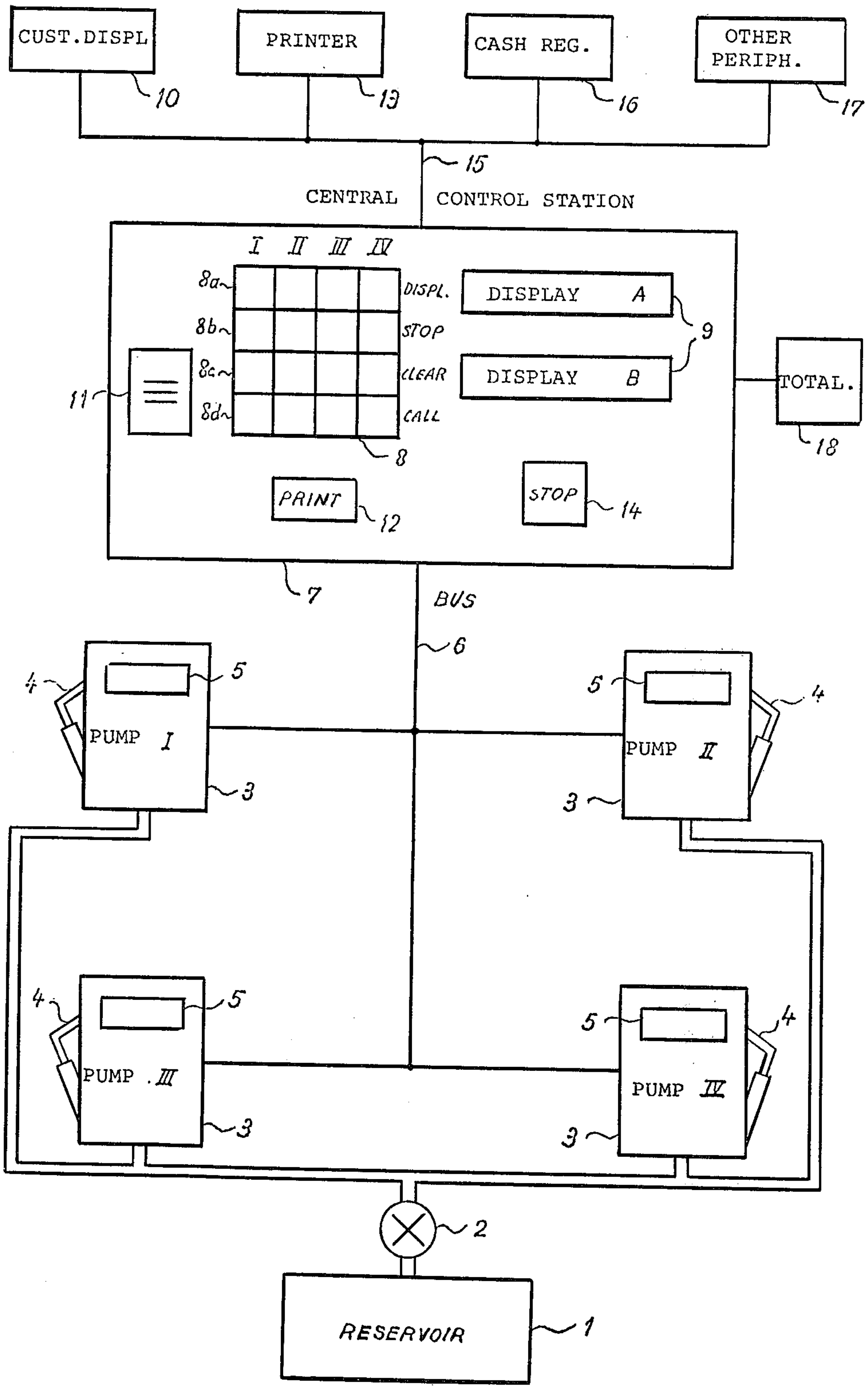
FIG. 1 is a block diagram of a self-service fuel filling station with four "gas-pumps".

The installation for delivering fuel represented schematically on FIG. 1 comprises a gasoline reservoir 1 which feeds, under constant pressure by means of a conventional pump 2, four delivery pumps or "columns" 3(I), (II), (III) and (IV), respectively. Said pumps comprise, as shown in the drawing, delivery nozzles 4 (I to IV) connected to a hose and a display window or panel 5 (I to IV) which displays the indications relative to the volume and the price of the gasoline delivered by the pump. Naturally, as a modification, the installation could also comprise one individual pump for each delivery column. Each column or pump is connected by means of a multiconductor cable 6 to a central control-station 7 installed in the cabin of the service-man. The latter is responsible for starting up the installation, checking the operation and cashing the bills. Cable 6 (BUS) permits transmitting to station 7 all informations to be displayed in connection with the measurements and computations performed in each pump. The cable is designed, according to usual techniques, as a function of the mode of calculation and of transmission of said information. In the present embodiment, it comprises at least four wires for operating according to the BCD mode (Binary Coded Decimal). Naturally, cable 6 represented on the drawing also comprises other wires for controlling the operational functions of the present installation, i.e. valves, motors of the pumps, etc.

The control station 7 comprises, represented schematically as a block 8, a series of switches — e.g. push-button switches — for cutting on or off the various functions of the present installation. Roman decimals designate the switches relative to the delivery pumps 3 (I, II, III and IV), respectively, and the rows **8*a* to 8*d* of said switches concern the following functions: buttons 8*a* (DISPL) are for switching on the displayed information panels 9A and 9B of the central station and on panel 10 located outside the control-room and which is read by the customer who is waiting for paying his bill. The reason why two different display systems, 9A and 9B respectively, have been provided on the control-station 7 will be explained hereinafter. Buttons 8*b* (STOP) are intended for possibly stopping the pump or shutting the valve that controls the flow of liquid to said pump. Buttons 8*c* (CLEAR) are to free the delivery pump for zero reset when a new customer unhooks the nozzle. The CLEAR function also permits performing other operations which will be described later. Buttons 8*d* (CALL) are used by the service-man to communicate with the clients by means of a conventional intercom, the loudspeaker of which is represented by block 11. The central station further comprises a switch 12**

(PRINT) for printing the displayed figures on a cash-receipt by means of a conventional printer 13, and a switch 14 (STOP) for completely stopping the installation if necessary. The central station is connected, by means of a multiconductor lead 15 similar to lead 6, to the following peripherals: customer display system 10 and printer 13 already mentioned, a cash-register 16 and other peripherals 17, for instance a storage memory 17 operating conventionally, e.g. with a magnetic or punched tape. Finally, the central-station is further connected to a general totalizer 18 for recording and knowing the total quality of fuel delivered during a certain period (1 month, 1 year, etc.) and the corresponding amount of cash.

Figure 2:
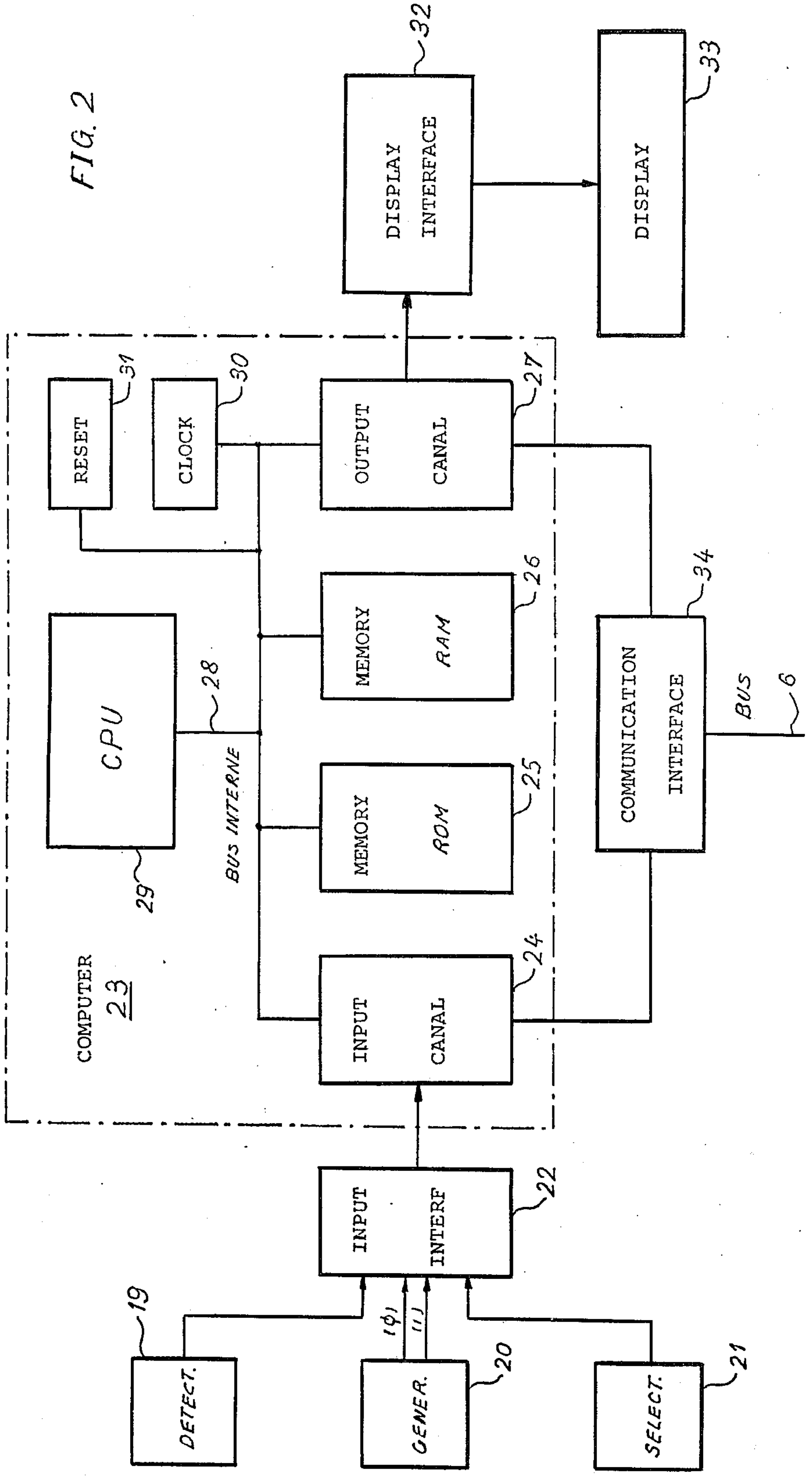
FIG. 2 represents, by means of blocks, the essential functions of the computer of a delivery pump of said station, together with the peripherals and input and output interfaces and communication interfaces thereof with the central station.

The essential organs which are found in the delivery pumps or columns 3 represented on Fig. 2 include first the input interfaces, i.e. a proximity detector 19, a two-channels ($\phi$ and 1) pulse generator 20 and a price selector 21. Detector 19, which may be of a conventional type, e.g. magnetic, permits detecting whether nozzle 4 is hooked or unhooked. The pulse generator which can be of a conventional type also is connected, as in ordinary installations, to a conventional flowmeter (not shown in the drawing of pump 3 in order to furnish at the output of its two channels, as described in detail hereinafter, a number of pulses which is proportional to the volume of liquid delivered. The price selector 21 is a conventional decimal code selector (BCD code), the output signal of which correlates with the unit selling price of the fuel being sold.

Circuits 19, 20 and 21 are connected to the input interface circuit 22 of a computer 23 of the delivery pump 3. This computer can be of any type provided its dimensions fit within the space available in the pump. For instance, the following computer is suitable : Type MCS-4 micro-computer manufactured by the INTEL Company.

This micro-computer comprises in this embodiment an input channel 24, a read only memory (ROM) 25, a random access memory (RAM) 26 and an output channel 27 all connected by means of an internal bus 28 to a central processing unit (CPU) 29. This CPU is itself piloted by a snychronization clock 30 and a reset element 31. It should be noted that the ROM 25 could be replaced by a programmable read only memory (PROM).

The circuits which are enclosed in the delivery pump further comprise the display interface 32, the display system 33 and the communication interface 34 which, by means of bus 6, transmits the information to be displayed to the central station 7.

Figure 3:
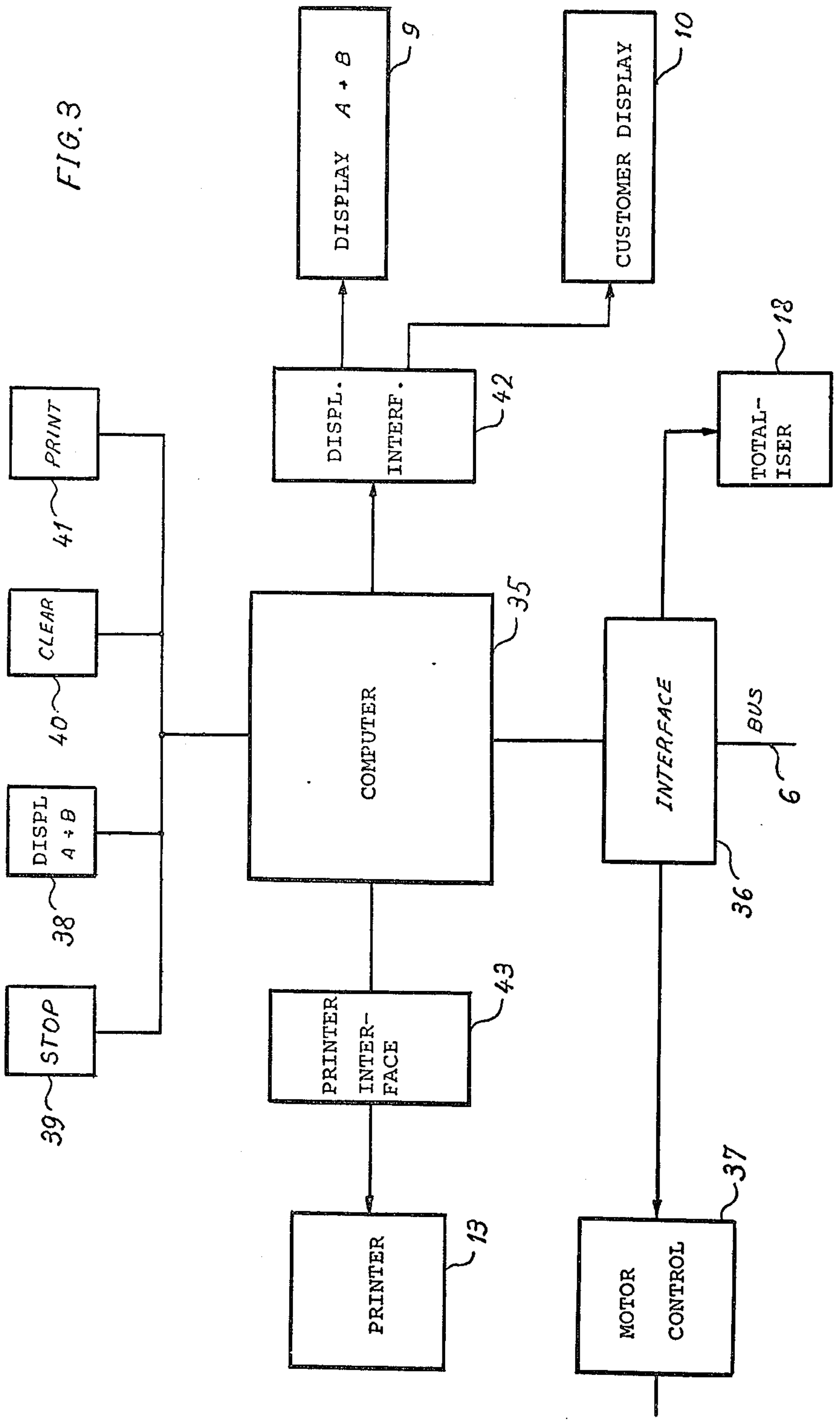
FIG. 3 is a block diagram of the main functions of the central station.

Said station 7 comprises the following functions illustrated on FIG. 3. For the sake of clarity, the functions which are common to all delivery pumps have been represented by only one common block.

Station 7 comprises a computer 35, in the present case a micro-computer MCS-4 similar to the micro-computer 23 but, naturally, operating differently. As modifications, other types of computers could be used. Computer 35 receives the information transmitted from output interface 27 through input interface 36 which is itself connected to a circuit 37 for controlling the motor of the pump 2.

Computer 35 is controlled by a series of circuits 38, 39, 40 and 41 which are put into operation by switches 8*a*, 8*b*, 8*c* and 12, respectively, so that the information to be displayed is transmitted firstly to the display organs 9 and 10 through interface 42 and secondly to printer 13 through interface 43.

It should be mentioned that all the elements and the circuits described hereinabove are conventional circuits and parts well known in the art and either easy to build according to known methods or commercially available.

The operation of the present installation is the following:

When the present installation is connected to its power supply, all the circuits are made ready to operate. Simultaneously, the timing clock starts and generates the time base of the system in the form of two trains of pulses $\phi$ and 1, identical but shifted one to the other. For instance, in the present case, said pulses (0.4$\mu$s) are produced every 1.35$\mu$s and the shift between the two trains is 0.2$\mu$s.

Also with the start-up of the whole installation, the monostable reset element 31 produces a pulse for resetting the circuits to zero, e.g. the program counter of the CPU 29, the RAM 26 and circuits 24 and 27.

Under the triggering action of the time base, the CPU produces every 10.8$\mu$s a synchronization pulse for differentiating the successive sequences of instruction, address and response pulses received or produced by the CPU and the other components of the computer MCS-4. All details of the routine of these operations can be found in the technical instruction bulletin: "MCS-4 Microcomputer Set", INTEL CORP. (1972).

Thus, in the present installation, the CPU begins to look for the preliminary instruction of the work program recorded in the ROM 25 by usual means; in return, it receives said recorded instruction and puts it into execution.

In the occurence, the first group of instructions or sub-routine consists in determining the nature of the signal existing in the input channel 24 produced by detector 19 through the input interface 22. So long as the nozzle 4 is still hooked by the user, detector 19 produces an appropriate signal, for instance a zero logical signal. Said signal is then available in the input interface circuit 22 which consists, for instance, in a shift register or any useful similar circuit. So long as this zero signal is present, the CPU repeats the above sub-routine and, since the latter only comprises 6 instructions with 8 or 16 bits, its repeating frequency is high — about every 60–70$\mu$s.

When a signal of logic 1 from detector 19 appears on the input interface 22, the CPU is able to undertake the second step of the program recorded in the ROM 25. To accomplish such task, the CPU first sends an order for resetting to zero an area A of the RAM 26, so as to erase all information from this area relative to a previous fuel delivery operation. Then, by means of a signal carried by bus 6 through the output interface 36, the CPU commands the start up of the pump motor or, as a modification, the opening of the feeding valve of the delivery column. However, for all this to occur, it is necessary for the service-man or cashier to first press the CLEAR function 40. The purpose of this CLEAR function, the circuit of which is conventional, is to render the delivery pump free and available for a new client and to transfer, as explained hereinafter, the information relative to the previous client recorded in area A of the RAM 26 from said area A to a different area (area B) of said RAM 26. Then, the CPU starts to question repetitively through its circuit 24 the shift register 22 which communicates with the pulse-generator 20 connected to the flow-meter of the delivery pump.

In itself, the operation of the nozzle is independent from the rest of the installation. When the liquid starts flowing across the flow-meter, the generator produces pulses the number of which is proportional to the volume of liquid delivered and the frequency proportional to the rate of delivery. Said pulses are transmitted to the CPU and, from there, to the RAM 26 wherein they are piled (recording of the total of the volume of liquid delivered). Then, still following the instructions of the program, and on receiving the first counting pulse, the CPU undertakes the computation of the cash value of the fuel being delivered according to the following computation routine: in reason of an adequate shifting of the register 20, the CPU begins to read the unity price of the fuel given by selector 21, then it memorizes said price within an appropriate place of RAM 26. In the present embodiment, this operation takes place just before the counting of the pulses is started but it could actually be scheduled differently. It should be moreover remarked at this stage that the order of succession of the various operations described herein is not critical and could be other. The present order has been selected just for convenience. For instance it would be perfectly possible to read and check the unity price given by selector 21 before the start-up of the motor of the pump 2. During the whole counting operation, the CPU will continue using this unitary price recorded in the RAM so as to remain independent of any accidental change of selector 21 in the course of the delivery operation. Then, according to the usual computing procedure, the CPU multiplies said unit price by the number of counting pulses and accumulates the result in said RAM. It is important to note that, according to the routine of the program, this calculation is repeated continuously. Thus, since the frequency of the counting pulses is in the order of 100 Hz (10 ms) and since the cycle of all the operations in connection with the cost computation done by the CPU, together with check-up and display (see flow-chart of FIG. 4), lasts at most 2 to 3 ms, it is understood that said cycle can be easily repeated in the time between the arrival to two consecutive pulses.

As mentioned above, the pulse generators accepted by the Departments of Weights and Measures have two outputs (ϕ) and (1), shifted for example by 180°. This mode of construction is needed for reliability reasons and, in conventional installations, each of these outputs is connected to a comparison circuit (check-up circuit), the results furnished by said circuits being thereafter used for making the computations.

In the present installation, the method is different: Two calculation sub-routines have been recorded according to usual means, in two distinct places of the memory 25, said subroutines being intended for having the CPU carry out all calculations twice using the signals provided by channels (ϕ) and (1) of the output of the pulse-generator. These sub-routines can be identical, incidentally. Following the program, the CPU goes alternatively from one of the above sub-routines to the other upon reception of the corresponding (ϕ) and (1) pulses, said pulses, as well as the signals corresponding to the results of the volume and cost calculations, being also accumulated in two independent areas (ϕ)A and (1)A of RAM 26. It is evident that, as mentioned above, because of their comparative speed, the calculations can take place sequentially without mutual hindrance. The benefit of this arrangement is due to the possibility, by repeating the computations according to two completely independent sub-rountines, to avoid errors arising from unexpected causes, e.g. spurious pulses, noise, etc. Hence, the reliability of such a device is better than, or at least equivalent to, that of the conventional devices using a doubled calculation unit, that is a calculator wherein each operational circuit is present as two units. It should also be noted that, in the present embodiment, if the CPU were to break down for any reason, the results, if ever displayed, would show a very broad error easily distinguishable, which is not the case with conventional installations.

The CPU continuously compares the number of pulses (ϕ) and the number of pulses (1) received at each moment by computer 23 as well as the results of the corresponding cost calculations. A possible plus or minus difference is stored immediately and if the total (in one or the other direction) is more than two units (which corresponds to 20 ml of liquid), the CPU causes, by usual means, the stopping of the pump or the closing of the valve corresponding to the defective delivery column (STOP function).

It should be remarked that these operations of checking the initial data and the results by repeated comparisons of operation and control signals can be adapted, at will, to most operative functions of the present installation. Indeed, the variety of the programs which can be given to the computer to carry out said checkings is practically endless. For instance, it can be mentioned that the accuracy of the price readings on selector 21 can be easily verified according to this procedure by using the reverse outputs of the BCD coding unit connected to said selector 21.

After each calculation operation, and still according to the development of the specified program, the CPU picks up again the information stored in the RAM 26 and sends it to the output channel 27 and, from there, to the display interface circuit 32 and finally to the so called display system 33. All these operations take place according to usual procedures; the display system can be any conventional system but, in the present embodiment, it comprises using a seven segment display.

The rate at which the signs displayed are renewed on the panel is the same as the rate of calculation (~2–3 ms); however, for an observer, only the changes of figures will be visible, that is those changes which occur at the same rate as the frequency of the flow-meter pulses. This continuous repetition of the display contributes to ensure an even greater reliability to the display system.

The checking of the luminous elements of the display is done by verifying whether the existence of a signal for controlling the on state of one given segment does correspond to a power consumption of said element. This checking can be effected by usual means; for instance, in the present case, when an element is on it produces by means of a series resistor a signal which is compared to the signal controlling said segment, said signal being available on the seven segment decoding unit to which said element is connected.

The display information processed by the CPU is also transmitted, via the communication interface 34, the bus 6 and the input interface 36, to the computer 35 of the centralstation 7. By cutting on the display control function 38 by means of the corresponding switch 8a, the service-man can cause the information to be displayed to appear on the panel 9A, the signals being transmitted through interface 42. The correctness of the transmission of the information to be displayed is also checked otherwise as described hereinafter.

When a client which has finished filling his reservoir returns the nozzle into the recess on delivery pump 3, the detector 19 detects this change of condition and sends a corresponding signal to the CPU. As a consequence, the latter orders the motor of pump 2 to stop or, alternatively, the valve supplying the delivery column to close. However, even during this period, the CPU continues calculating the data to be displayed on the basis of the signals transmitted from generator 20 and sending them to the display systems 33 and/or 10.

This condition is maintained until the service-man pushes the button 8c relating to the delivery pump just been used which activates the CLEAR function 40. This function performs as follows: it resets the appropriate part of the CPU in its initial state, that is, in the state of being receptive for an information from detector 19. In other words, the delivery pump is now ready for being used by another client. Simultaneously, the signals displayed on said pump are cut off and the information stored in ram 26 (areas ($\phi$)A and (1)A) is transferred by the CPU into another area of said RAM (e.g. areas ($\phi$)B and (1)B), in order to clear the initial area free for storing the data of a new customer. However, even when a new customer unhooks the nozzle, the data are not erased on the display of the central station. The merit of such a program is evident: it allows the pump to operate practically permanently; a new customer can take the fuel he needs even though the previous customer has not paid his bill yet.

For allowing the service-man or cashier to watch these successive operations, the activation of the CLEAR function 40 also results, according to the program development and under control from the CPU, in a shift of the information displayed from panel 9A to panel 9B of the central-station and, if desired by the cashier, to the customer panel 10 located above the cashier's desk. Hence, the cashier keeps an eye on the data of the first client while the data relative to the second client already appear on display panel 9A. The computer 23 can therefore take care of two customers simultaneously which is impossible with the circuits generally used in conventional fuel filling installations. The print function 41 is then used for transferring the displayed information, through interface 43, to the ticket printer 13.

It will be further noted, as mentioned before, that the program stored in the ROM 25 allows a continuously repeated control of the data emitted by each pump towards the centralstation 7. Thus, central computer 35 sends the data furnished by the delivery pumps back to the CPU's of the latters wherein a comparison is being done. In case of repeated discordance (e.g. more than ten fold), the computer activates the STOP function 39 so as to stop the flow of liquid and to cancel the display; the service-man will be informed of the situation, for instance by the flashing of corresponding switch 8*b*.

It will be furthermore noted that the performance of the present installation could be modified at will be simply modifying the program recorded in the memory 25 or by replacing said memory by another one with a different program. It is consequently possible to introduce, as modifications, other functions and other checking operations depending on the requirements of the Weights and Measures Department in each country. Indeed, there is no practical limit to the number and the variety of operations that a computer can perform. In the case of using a MCS-4 micro-computer, it is possible to use a read only memory having up to 4096 words.

Figure 4A:
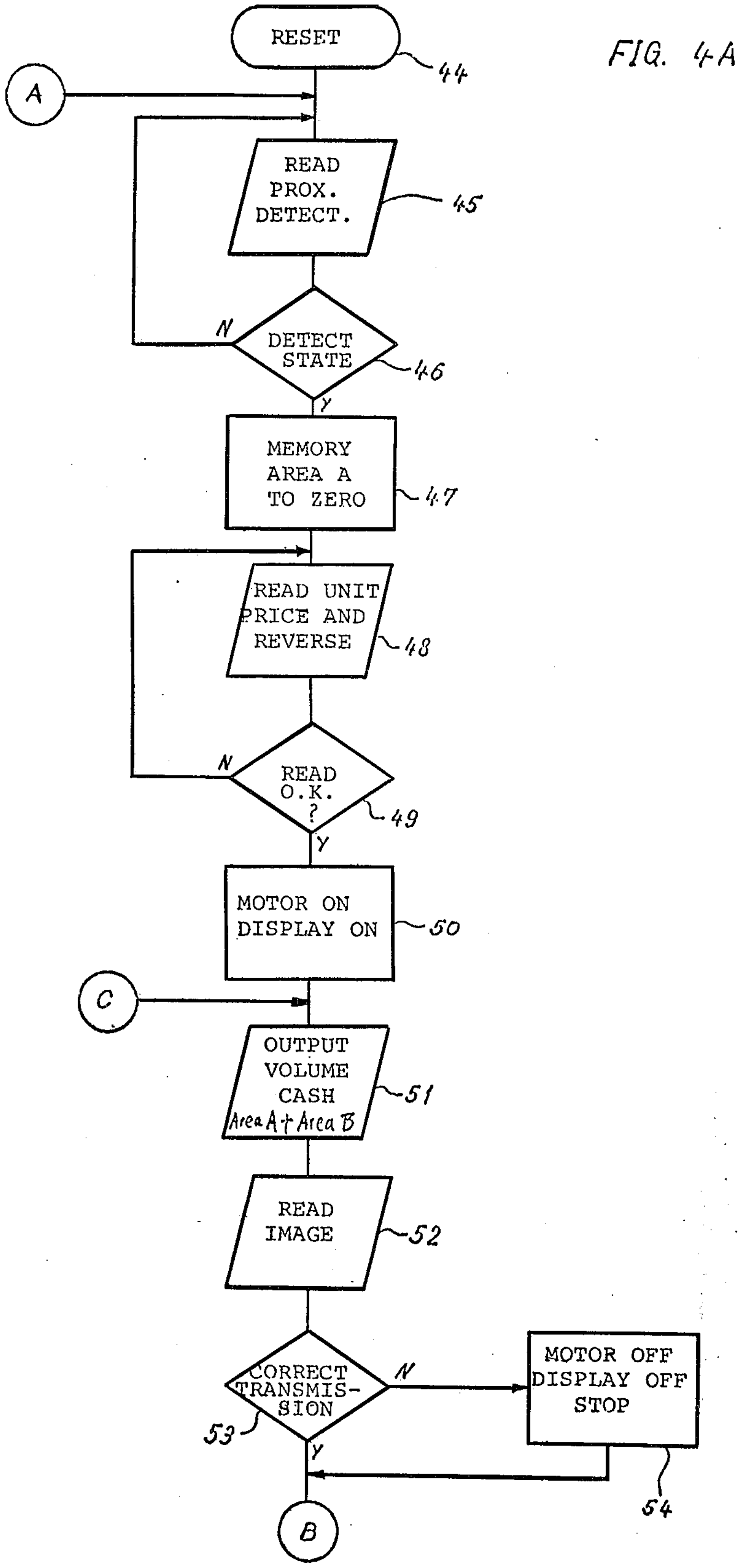
FIG. 4 (A, B and C) represents the flow-chart of a type of program applicable to the computer of a fuel distribution pump which is part of the installation of FIG. 1.
Figure 4B:
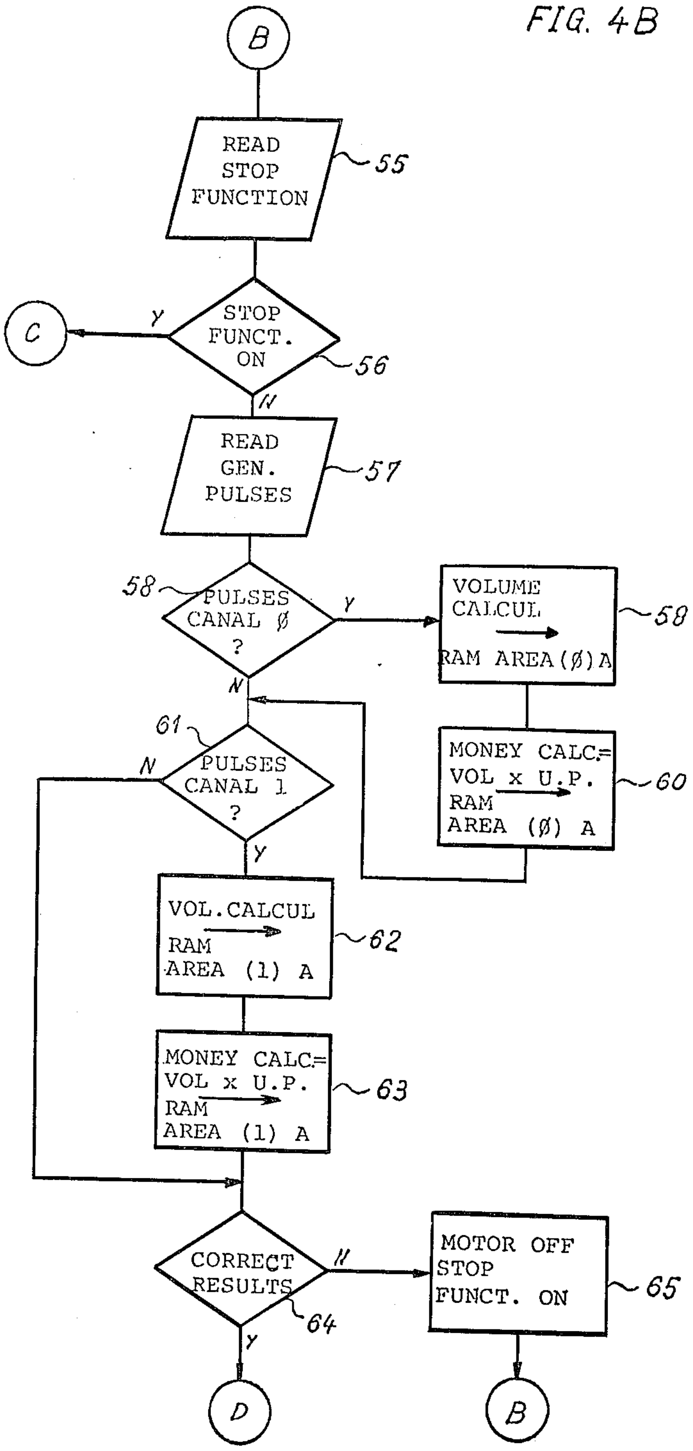
Figure 4C:
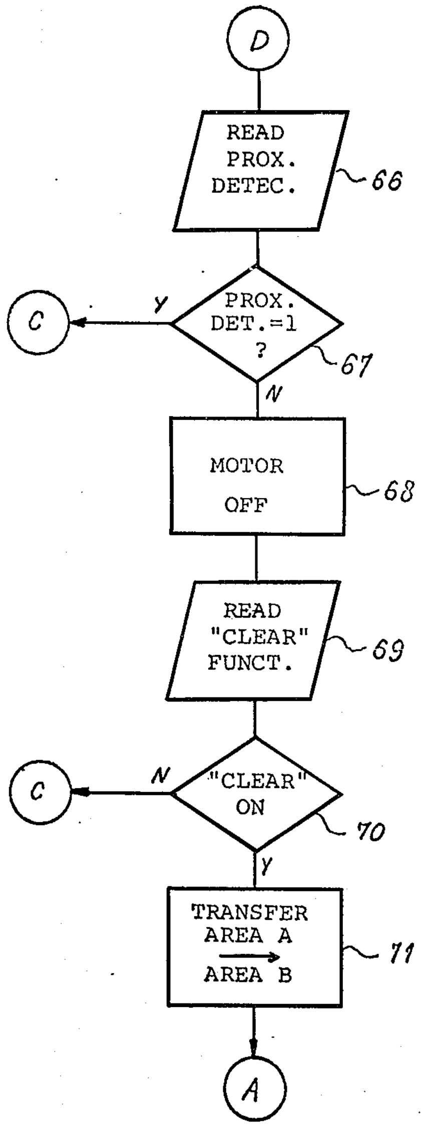

In the flow-chart of FIG. 4, the functions and the connecting points have been represented by the following blocks:

Slanted tetragons: input and output functions.

Diamonds: question and decision functions; $Y$ = yes, the condition is met; $N$ = No, the condition is not met.

Rectangles: data processing functions.

Flatted circles: stop and start functions.

Circles: junction points. The points having the same letter are connected together.

The flow-chart of FIG. 4 comprises the following successive blocks.

A resetting block 44 corresponding to the action of the logical function 31 described hereinabove.

A function 45 for reading the proximity detector 19 of the nozzle 4.

A decision function 46 of conditional connecting, the direction of action of which depends on the state of detector 19. If this state is zero, the decision is N and the program remains in the waiting loop of functions 45 and 46. If the state of the detector is 1, the program continues with function 47.

Block 47 concerns the resetting to zero of area A of the RAM 26.

Block 48 refers to the reading of the unit price of the fuel determined by selector 21 and its reverse output.

Block 49 concerns the evaluation of the above information and the decision resulting from the result. In case of disagreement (N), the question is repeated according to the waiting loop. If the reading is correct, the program goes to block 50.

Block 50 concerns the start-up of the motor of the pump and the activation of the display interface 29 by CPU 29.

Block 51 concerns the outsending the information contained in the areas A and B of the RAM 26 to the display systems 33 and 9.

Block 52 concerns the reading of the image of signals transmitted from CPU 29 to control-station 7 for checking purposes.

Block 53 relates to the checking function by computers 23 and 35 of the correctness of the transmitted information. In case of error (N), block 54 is involved which relates to the activation of the STOP function for the pump motor and the vanishing of the displayed figures, this state of affairs being signalled by a flashing of the bulb of button 8*b* (STOP). If the transmission is correct, then the program develops with block 55.

Block 55 concerns the reading of the STOP function and

Block 56 concerns the decision resulting from the previous reading. If the STOP is on (Y), the program stays in the loop resulting from connecting points C—C until the reason for having a STOP condition is being corrected. If the STOP is off (N) the program passes on block 57.

Block 57 concerns the reading of the pulses coming from generator 20.

Block 58 concerns the decision relative to whether a counting pulses is comming or not from the ($\phi$) channel of the generator 20. In the first case (Y), the calculations of volume and cost are carried out (blocks 59 and 60) followed by their storage in the area A of RAM 26. In the second case (N), block 61 is involved.

Block 61 concerns the same function s block 58 but relatively to the pulses of channel 1 of the generator.

Blocks 62 and 63 concern the calculation and storage operations (c.f. blocks 59 & 60) relating to the channel 1 pulses of said generator.

Block 64 concerns the function of checking the volume and cost results calculated from data (ϕ) and (1). If they coincide, block 66 is called. If not, then block 65 is involved.

Block 65 concerns the activation of the STOP function and the returning backwards through the B-B loop of the flow-chart.

Block 66 concerns the reading of detector 19.

Block 67 concerns the decisions relative to the previous reading. If the reading is positive (e.g. a logical signal 1), the nozzle 4 being unhooked, the program starts again at C. Otherwise, it goes to block 68.

Block 68 refers to the stopping of the pump motor.

Block 69 concerns the reading of the CLEAR function 40. If this function is still off (N), the program starts at C again. Otherwise (Y), it goes to block 71.

Block 71 concerns the transfer of data from the area A to the area B of RAM 26 and the corresponding displays and the return of the program to the starting point A of the flow-chart.

As a conclusion, it will be noted that the presence of a computer has provided the present installation with a plurality of complex functions which grant thereto a high rate of performance and an operating safety or reliability never reached until now, within reasonable limits of weight, space and costs. However, it is probable that in the future, with the fast development of new cheap electronic micro-components (e.g. intergrated circuits), it will be possible to manufacture specific circuits offering the same service as those obtained from the computer of the present installation.

We claim:

1. In an installation for the remote control of a liquid disperser comprising a main control station, at least one liquid pump having a flow meter and display panel in electrical communication with the main control station and means in electrical communication with said pump for monitoring and controlling the dispensing of liquid, the improvement comprising including a programmable general purpose computer as the monitoring and controlling means wherein the operating program of the computer of the pump is stored in a programmable read only memory (PROM) and wherein said memory comprises in its operating program, for the determination of the volume of liquid and of the sum of money to be paid, two independent sub-routines which cause the central processing unit (CPU) of the computer to carry out the necessary calculations, in two independent sequences from two independent trains of counting a pulses (ϕ) and (1) from the pulse-generator coupled to the flow-meter.

2. The installation of claim 1, wherein said memory further comprises another sub-routine for having the CPU continuously compare the results from the calculations performed on the two independent trains (ϕ) and (1) of pulses, and in case of a discrepancy greater than a chosen margin, for having the delivery pump be disabled and stopped.

3. The installation of claim 1, wherein the computer comprises a random access memory (RAM) for storing and temporarily restoring some of the data provided by the CPU, and wherein the PROM comprises in its operating program sub-routines for having the CPU store in said RAM (area A) the information relative to the quantities and cost of the liquid delivered to a customer and display said information on the display system then, on order from the main station, to transfer said information into another area (area B) of said RAM, re-store them again therein and display them on a further display panel, so that a new customer, the initial recording and displaying areas being now available, can draw liquid from the same pump before the previous customer has paid his bill.

* * * * *